(12) United States Patent
Lewis et al.

(10) Patent No.: US 8,688,452 B2
(45) Date of Patent: Apr. 1, 2014

(54) AUTOMATIC GENERATION OF DISTRACTORS FOR SPECIAL-PURPOSE SPEECH RECOGNITION GRAMMARS

(75) Inventors: James Robert Lewis, Delray Beach, FL (US); Andrew Simpson, London (GB); Peeyush Jaiswal, Boca Raton, FL (US)

(73) Assignee: Nuance Communications, Inc., Burlington, MA (US)

( * ) Notice: Subject to any disclaimer, the term of this patent is extended or adjusted under 35 U.S.C. 154(b) by 1722 days.

(21) Appl. No.: 11/937,410

(22) Filed: Nov. 8, 2007

(65) Prior Publication Data

US 2009/0125297 A1  May 14, 2009

(51) Int. Cl.
*G10L 15/18* (2006.01)
*G06F 17/27* (2006.01)

(52) U.S. Cl.
USPC ............................................... 704/257

(58) Field of Classification Search
USPC ....................................................... 704/257
See application file for complete search history.

(56) References Cited

U.S. PATENT DOCUMENTS

| 6,185,530 | B1 | 2/2001 | Ittycheriah et al. |
| 6,192,337 | B1 | 2/2001 | Ittycheriah et al. |
| 6,224,383 | B1 * | 5/2001 | Shannon ............... 434/156 |
| 6,269,335 | B1 | 7/2001 | Ittycheriah et al. |
| 6,963,834 | B2 | 11/2005 | Hartley et al. |
| 6,975,986 | B2 | 12/2005 | Hartley et al. |
| 7,219,056 | B2 | 5/2007 | Axelrod et al. |

* cited by examiner

*Primary Examiner* — Susan McFadden
(74) *Attorney, Agent, or Firm* — Wolf, Greenfield & Sacks, P.C.

(57) ABSTRACT

A computer-implemented method for dynamically generating a speech recognition grammar is provided. The method includes determining a target entry, and accessing a plurality of potential distracters. The method also includes selecting one or more distracters from the plurality of potential distracters. More particularly, each potential distracter selected is selected based upon an assessed acoustic dissimilarity between the distracter and the target entry. The method further includes dynamically generating a speech recognition grammar that includes the target entry and one or more of the distracters selected based upon an acoustic dissimilarity to the target entry.

20 Claims, 5 Drawing Sheets

AUTOMATIC GENERATION OF DISTRACTORS FOR SPECIAL-PURPOSE SPEECH RECOGNITION GRAMMARS

FIELD OF THE INVENTION

The present invention is related to the field of automatic speech recognition, and more particularly, to techniques for improving speech recognition grammars.

BACKGROUND OF THE INVENTION

Automatic, or computer-based, speech recognition is a process by which human speech signals are converted to a sequence of words in digital form using an algorithm implemented in a computer program. Generally, these algorithms are based upon mathematical and/or statistical models for identifying and transcribing words from digitized speech signals.

An important ingredient of virtually any speech recognition application is the speech recognition grammar of the particular application. Many speech recognition applications utilize relatively straightfoward speech recognition grammars having limited vocabularies comprising words and/or phrases common to a particular application. For example, a speech recognition application for handling calls pertaining to a banking customer's account might well employ a speech recognition grammar containing entries such as "checking," "savings," "loan," and "money market."

Other speech recognition grammars are utilized for a more specialized purpose, namely, that of gathering information to establish the identify of the speaker. It is worth noting that applications that utilize such grammars are distinct from those that perform voice matching—also known as voice identification, voice verification, and voice biometrics—in that speech recognition identification typically only entails the more standard recognition technologies for converting speech to text.

Speech recognition applications for establishing a speaker's identity are generally based on one of two distinct approaches. According to the first approach, a speech recognition grammar comprises a single entry, the target entry, which is a particular piece of information that the speaker is expected to know and enunciate to the speech recognition system. For example, a call processing system may prompt a caller for the caller's account number, and then, having ascertained the caller's surname from the account information, requests that the caller speak his or her surname. Thus, the caller's identity can be confirmed if the spoken surname matches that known to the system and corresponding to the account information. At this point during the procedure, the active speech recognition grammar utilized by the system comprises only a single entity: the surname corresponding to the account information. Since the speech recognition application is designed to optimally match, in a probablistic sense, a speech utterance to a grammar entry, the confidence level can be designed to provide the best trade-off between false acceptance of an incorrect utterance and false rejection of a correct utternace.

A modification of this approach entails adding one or more so-called distractors to the grammar. A distractor is an incorrect response selection. In the context of speech recognition, a distractor adds to the speech recognition grammar a concrete alternative that is distinct from a target entry, thereby increasing the likelihood that the speech recognition system will correctly reject an utterance that does not in fact match the target entry. Conventional speech recognition grammars that utilize distractors typically include a single, static set of distractors. The effectiveness of the distractors generally varies, however, depending on the degree of dissimilarity between the distractors and a particular target entry.

SUMMARY OF THE INVENTION

The present invention is directed to a system, computer-program product, and related methods for dynamically generating speech recognition grammars. One aspect of the grammars dynamically generated according to the invention is the inclusion of one or more distractors. According to the invention, a characteristic of the distractors is that each is dynamically selected from among a pool of distractors based upon the acoustic characteristics of a target entry that is to be identified by a speech recognition engine.

One embodiment of the invention is a dynamic grammar builder, which comprises a system for dynamically generating a speech recognition grammar. The system can include an electronic storage for storing a plurality of potential distractors. Additionally, the system can include an analyzing module for analyzing acoustic dissimilarities between each of the potential distractors and a user-supplied target entry. The system further can include a grammar-generating module for selecting at least one distractor from among the potential distractors. More particularly, the grammar-generating module can be configured to select one or more distractors having a predetermined level of acoustic dissimilarity to the target entry, and to generate a grammar that includes the target entry and at least one selected distractor.

Another embodiment of the invention is a computer-implemented method for dynamically generating a speech recognition grammar. The method can include determining a target entry, and accessing a plurality of potential distractors. The method also can include selecting one or more distractors from the plurality of potential distractors, each selected distractor being selected based upon an acoustic dissimilarity between the distractor and the target entry. The method further can include generating a speech recognition grammar that includes the target entry and the at least one distractor.

BRIEF DESCRIPTION OF THE DRAWINGS

There are shown in the drawings, embodiments which are presently preferred. It is expressly noted, however, that the invention is not limited to the precise arrangements and instrumentalities shown.

DETAILED DESCRIPTION

The invention, in various embodiments, is directed to dynamically generating speech recognition grammars that include one or more distractors, each of which is selected for inclusion in a speech recognition grammar based upon the acoustic characteristics of a target entry that is to be identified by a speech recognition engine. The inclusion of one or more distractors in a speech recognition grammar provides a concrete alternative that enhances the likelihood that a speech recognition engine can correctly reject a speech utterance that does not match the target entry. Providing a pool of distractors, each specifically chosen with respect to a particular speech application, can enhance the operative efficiency of the speech recognition engine. Dynamically generating a grammar that includes one or more distractors based upon the acoustic characteristics of the target entry can significantly enhance the accuracy of the speech recognition engine.

Figure 1:
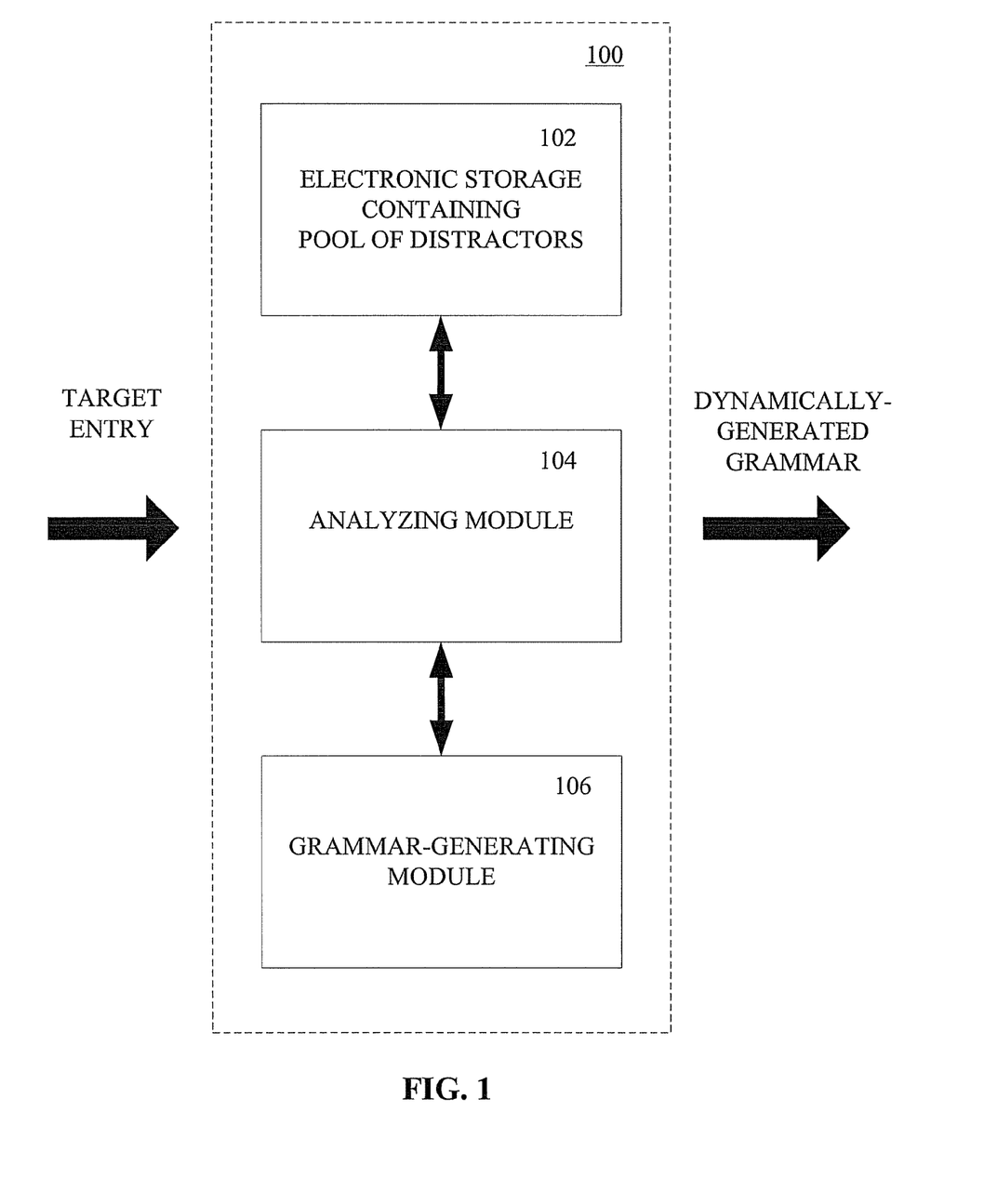
FIG. 1 is a schematic view of a dynamic grammar builder, according to one embodiment of the invention.

FIG. 1 is a schematic diagram of a system, defined herein as a dynamic grammar builder 100, for dynamically generating a grammar according to one embodiment of the invention. The dynamic grammar builder 100 illustratively includes an electronic storage 102 for storing a plurality of potential distractors. Additionally, the dynamic grammar builder 100 illustratively includes an analyzing module 104. The analyzing module 104 is configured to analyze the acoustic characteristics of a target entry and to determine acoustic dissimilarities between each of the potential distractors and the target entry. The dynamic grammar builder 104 also illustratively includes a grammar-generating module 106 for dynamically generating a grammar that includes the target entry and at least one selected distractor.

The analyzing module 104 and/or the grammar-generating module 106 can be implemented in dedicated hard-wired circuitry configured to perform the various operative functions described herein. Alternatively, the analyzing module 104 and/or the grammar generating module 106 can be implemented in computer-readable code configured to execute on an application-specific or general-purpose computing device having logic-based circuitry for executing such code. In still another embodiment, however, the analyzing module 104 and/or the grammar generating module 106 can be implemented in a combination of hard-wired circuitry and computer-readable code. The electronic storage 102 can be, for example, a mass storage device, a read-only memory (ROM), a random-access memory (RAM), or any other device capable of storing electronic representations of data.

The analyzing module 104, more particularly, can be configured to determine the acoustic dissimilarities between potential distractors and a target entry according to a variety of known techniques. One known technique for determining acoustic distinctiveness between two words is to compute a distance measure, or score, based upon pair-wise comparison of the respective leferne (leaf) sequences of the two words. Aspects of this technique are described more particularly in U.S. Pat. No. 6,192,337, Apparatus and Methods For Rejecting Confusible Words During Training Associated With A Speech Recognition, in U.S. Pat. No. 6,269,335, Apparatus and Methods for Identifying Homophones Among Words In A Speech Recognition System, and in U.S. Pat. No. 6,185,530, Apparatus And Methods For Identifying Potential Acoustic Confusibility Among Words In A Speech Recognition System, each of which is assigned to the assignee of the present invention and is incorporated by reference herein in its entirety.

Another known technique for determining acoustic distinctiveness between two words is to perform a confusability calculation using a matrix determined from two types of hidden Markov models, denoted respectively as an evaluation model and a synthesizer model. This technique is described more particularly in U.S. Pat. No. 7,219,056, Determining And Using Acoustic Confusability, Acoustic Perplexity And Synthetic Acoustic Word Error Rate, also assigned to the assignee of the present invention and incorporated by reference herein in its entirety.

Figure 2:
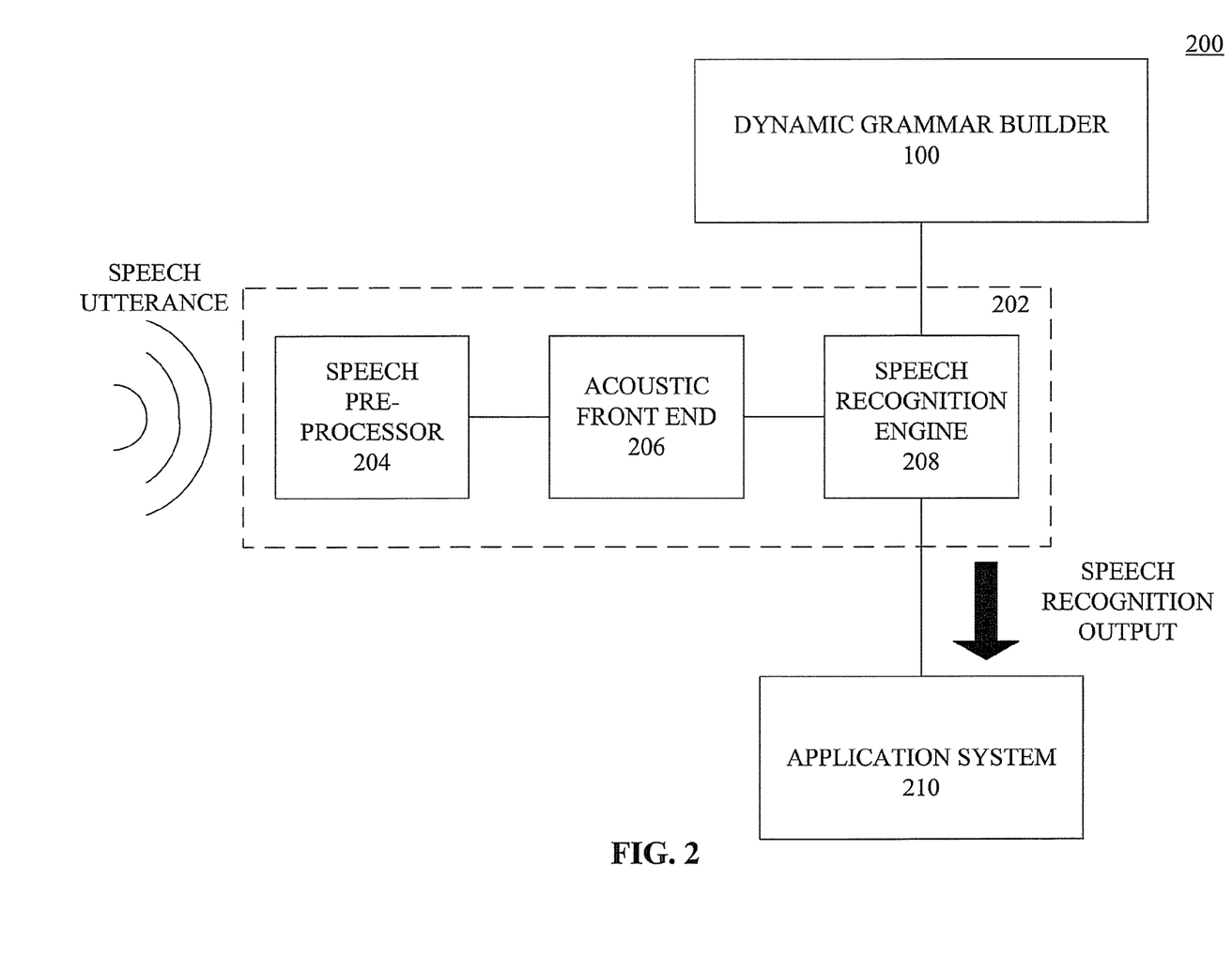
FIG. 2 is a schematic view of an exemplary speech recognition and application system with which the dynamic grammar builder illustrated in FIG. 1 is integrated.

Referring additionally now to FIG. 2, an exemplary combined speech recognition and application system 200 is shown schematically. The combined system 200 illustratively includes a speech recognition system 202 and an application system 210 communicatively linked to one another. The speech recognition system 202 generates speech recognition output, which in turn, is supplied to the application system 210. The application system 210 can be one of a variety of different systems that utilize speech, such as an automatic, voice-based call processing system. As illustrated, the dynamic grammar builder 100 can be integrated with the combined system 200 and, as described more particularly below, can operatively perform the function of dynamically generating a speech recognition grammar that is utilized by the speech recognition system 202.

The speech recognition system 202 illustratively includes a pre-processor 204, which generates representative speech waveforms in response to a received speech utterance. The pre-processor 204 can include a microphone, or other type of audio-to-analog transducer, for transducing an analog-form speech signal into an electrical signal. The pre-processor 204 also can include an analog-to-digital converter for converting the electrical signal into a digital signal representative of the speech utterance. The pre-processor 204, moreover, can sample the analog-form speech signal and partition the signal into overlapping frames such that each discrete frame can be individually processed by the speech recognition system 202. The resulting output of the pre-processor 204 is the sampled speech waveforms that correspond to the received speech utterance.

Additionally, the speech recognition system 202 illustratively includes an acoustic front-end component 206, which receives the speech waveforms provided by the pre-processor 204. The front-end component 206 generates signals or, more particularly, feature vectors that are derived from and correspond to the received speech waveforms. As will be readily understood by one of ordinary skill in the art, the front-end component 206 can be configured to generate various types of known feature vectors, including mel cepstra, delta, and delta-delta feature vectors.

The output of the front-end component 206 is provided to the speech recognition engine 208, which based upon the received input, generates a recognized speech output by searching for a best match between the speech utterance and an entry contained within a speech recognition application grammar. The recognized speech output resulting from the procedure performed by the speech recognition engine 208 is provided to the application system 210. Utilizing the output of the speech recognition engine 208, the application system 210 can perform various speech-based functions, such as processing calls.

Illustratively, the dynamic grammar builder 100 is communicatively linked to the speech recognition engine 208. The application system 210, with such a configuration, can convey a flag or other marker along with a target entry requesting that one or more distractors be generated. In an alternate embodiment, however, the dynamic grammar builder 100 can be a component of the application system 210. The application system 210, in this alternate configuration, utilizes the dynamic grammar builder 100 to create a target-plus-distractor(s) grammar before prompting a user to supply the target entry that is to be recognized. Accordingly, with this alternate configuration, the speech recognition engine 208 becomes actively involved only after the user has been so prompted to supply the target entry and responds to the prompt. I While the components and operative features of the combined system 200 thus far described can be provided by many different types of speech-reliant systems, the particular system 200 is modified according to a particular embodiment of the invention. Specifically, the system 200 integrates the dynamic grammar builder 100, which dynamically builds grammars that include a target entry and one or more distractors determined on the basis of their acoustic dissimilarity with the target entry, as already described. The dynamic grammar builder 100 is a system that illustratively includes the components described above in the context of FIG. 1, namely, each of the following: electronic storage for storing a pool of distractors; an analyzing module for selecting one or more distractors from among the pool of distractors based upon acoustic dissimilarities; and a grammar generating module for generating a grammar, which is utilized by the speech recognition engine 208 and includes the target entry as well as one or more distractors.

As already noted, the inclusion of one or more distractors results in a grammar that contains at least one distinct alternative to a given target entry. Utilization of the distractor-inclusive grammar can significantly increase the likelihood that in searching for a best match, the speech recognition engine 208 correctly rejects an incorrect utterance—incorrect, that is, in the sense that the utterance does not in fact correspond to the target entry. Consider, for example, an application system 210 that processes calls pertaining to the accounts of a bank's customers. The process can begin when the combined system 200 receives a customer's call and responds by prompting the customer for an account number. The combined system 200 can be configured to recognize the account number and to associate with the number the surname of the customer who owns the account. Subsequently, the system can request that the customer provide the surname as a speech utterance.

According to one embodiment of the invention, the dynamic grammar builder 100 can, at this point, intervene to generate a grammar with respect to the specific target entry. The requested surname of the customer is the target entry. The dynamically-generated grammar includes the target entry along with one or more distractors that are selected based on their acoustic dissimilarities with the target entry. Accordingly, given that the grammar utilized by the speech recognition engine 208 can include only the target entry and at least one acoustically dissimilar distractor, the probability that an imposter will be able to spoof the application system 210 using a false surname is significantly reduced.

This exemplary application also highlights certain other aspects of the invention. Firstly, the plurality, or pool, of potential distractors can be determined in accordance with the particular application. For example, in the context of the described system for processing calls pertaining to customer accounts, the potential distractors can be various surnames. Secondly, while the potential distractors can be treated as having equal priorities, in an alternative embodiment each potential distractor can be prioritized relative to one another. For example, a set, especially a large set, of potential distractors can be generated, and from that set a subset of preferred distractors can be culled. For example, again in the context of a system for processing calls pertaining to customer accounts, it reasonably can be assumed that an imposter is more likely to attempt to spoof the system by providing a common surname. Accordingly, the dynamic grammar builder 100 can be configured to generate a large pool of surnames as potential distractors, in which common surnames are given higher priority than less common ones.

In still another embodiment, the potential distractors can be prioritized by assigning an ordinal or continuous-measure ranking to each member of the set of potential distractors. For example, in creating a pool of surnames as potential distractors for the above-described call processing application, the assigned ranking or priority can be a function of the frequency of occurrence of each surname in a particular population set. More generally, the assigned ranking can be a continuous variable that measures a relative priority of each surname in the pool of potential distractors. For example, each of the potential distractors in the pool can be prioritized according to the degree of dissimilarity exhibited by each with respect to the particular target entry.

There is typically at least some variability in the pronunciation of a word. Another aspect of the invention takes such variability into account. More particularly, according to different embodiments of the invention, the application system 210 is configured to request that a speaker or caller initially spell the target entry. The dynamic grammar builder 100, accordingly, can be modified to include a parsing component or module for parsing words or phrases into alphabetic characters corresponding to the letters of an alphabet, such as the English-language alphabet.

The dynamic grammar builder 100 can generate a single grammar that contains one or more distractors for each letter spelling of the target entry. The operative functions of the dynamic grammar builder 100 can be illustrated by considering the generation of a grammar for the spelling of a name, such as the English-alphabet spelling of the name Lewis. The grammar can have one rule for a spelling of the target entry, Lewis, and another for the spelling of each distractor selected from a pool of distractors. Accordingly, if the target entry is the letter spelling of the name Lewis and that of two distractors—letter spellings of the names Smith and Wilson, for example—selected from a pool, then the resulting grammar is, according to this particular embodiment:

grammar=
LEWIS {Target}
|SMITH {Distractor}
|WILSON {Distractor}.

Accordingly, if a user is prompted to spell the name Lewis and responds with the proper spelling, then a speech recognition application receives the token Target, and speech recognition proceeds. If, however, the user spells a listed distractor name, then the speech recognition application receives the token Distractor and takes an appropriate exception path. If the user's input does not match either the target or a distractor, a notification can be generated, and the speech recognition application can again take an appropriate exception path.

In an alternate embodiment, however, the dynamic grammar builder is configured to generate different grammars for each letter. Specifically, the dynamic grammar builder 100 generates a grammar for a particular letter by selecting from among all the letters of the alphabet those letters that are acoustically dissimilar to the particular letter. The grammar is then used by the speech recognition engine to recognize a speech utterance comprising the spelling of a word or phrase.

In yet another embodiment, the dynamic grammar builder 100 is configured to assess the acoustic confusability among different letters. Techniques for determining acoustic confusability among individual alphabetic letters are described in U.S. Pat. No. 6,975,986, Voice Spelling In An Audio-Only Interface, and U.S. Pat. No. 6,963,834, Method Of Speech Recognition Using Empirically-Determined Word Candidates, each of which is assigned to the assignee of the present invention and is incorporated by reference herein in its entirety. The dynamic grammar builder 100 can be configured to implement one or more of these techniques.

The operative functions of the dynamic grammar builder 100 can be illustrated by considering, again, the generation of a grammar for the English-alphabet spelling of the name Lewis. The dynamic grammar builder 100 dynamically generates distractors by excluding from the set of all English letters those known to be weak or strong "synonyms" of the letters appearing in the character string L-E-W-I-S, the term synonym being used here to denote a confusable or an acoustically similar letter.

L possesses only one weak synonym, the letter M. Accordingly, the set of potential distractors for a grammar associated with the letter L, generated according to the invention, includes all the letters of the alphabet except L and M:

<A|B|C|D|E|F|G|H|I|J|K|N|O|P|Q|R|S|T|U|V|W|X|Y|Z>.

The potential distractors associated with the next letter, E, are all those letters of the alphabet that exhibit the "ee" sound. Thus, for E, the set of potential distractors is:

<A|F|H|I|J|K|L|M|N|O|Q|R|S|U|W|X|Y>.

The letter W has neither a weak nor a strong synonym, and thus the set of potential distractors includes all the other letters of the alphabet:

<A|B|C|D|E|F|G|H|J|K|L|M|N|O|P|Q|R|S|T|U|V|X|Y|Z>.

Likewise the letter I has neither a weak nor a strong synonym. Accordingly, the set of potential distractors is:

<A|B|C|D|E|F|G|H|J|K|L|M|N|O|P|Q|R|S|T|U|V|W|X|Y|Z>.

Finally, for the letter S there is one strong synonym, F, and two weak ones, H and J. Therefore, the set of potential distractors is:

<A|B|C|D|E|G|I|K|L|M|N|O|P|Q|R|T|U|V|W|X|Y|Z>.

Using the grammars thus generated, the speech recognition engine 208 has a high probability of correctly rejecting high-frequency, five-letter surnames such as Smith and Brown when the target entry is Lewis. Moreover, surnames of differing length can be reliably rejected based upon the inherent properties of a speech recognition grammar.

Figure 3:
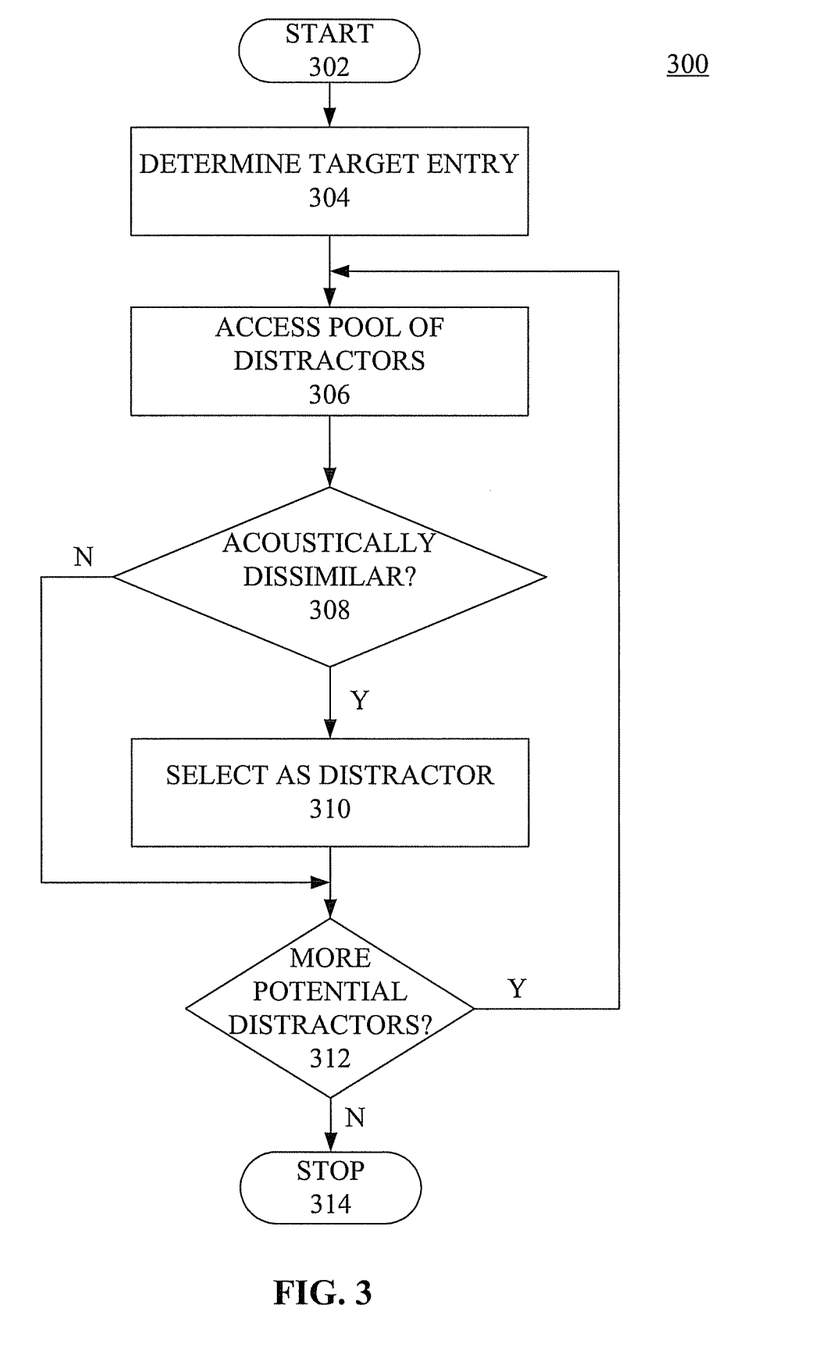
FIG. 3 is a flowchart of exemplary steps in a method for dynamically generating a grammar, according to another embodiment of the invention.

FIG. 3 is a flowchart illustrating a method aspect of the invention. The flowchart illustrates exemplary steps of a method 300 for dynamically generating a grammar, according to another embodiment of the invention. After the start at step 302, the method 300 includes determining a target entry at step 304. At step 306, a pool of distractors, specifically chosen in the context of a particular speech application, is accessed. A determination is made at step 308 as to whether a potential distractor culled from the pool is sufficiently dissimilar from the target entry based on the respective acoustic characteristics of each. If so the potential distractor is selected as a distractor at step 310. Optionally, the method 300 can include iteratively examining the acoustic characteristics of each potential distractor in the pool. Thus, as illustrated at step 312, if there are more potential distractors in the pool to be examined, steps 306-312 can be repeated until each of the potential distractors in the pool has been assessed in terms of its acoustic dissimilarity to the target entry. Illustratively, the method concludes at step 314.

Figure 4:
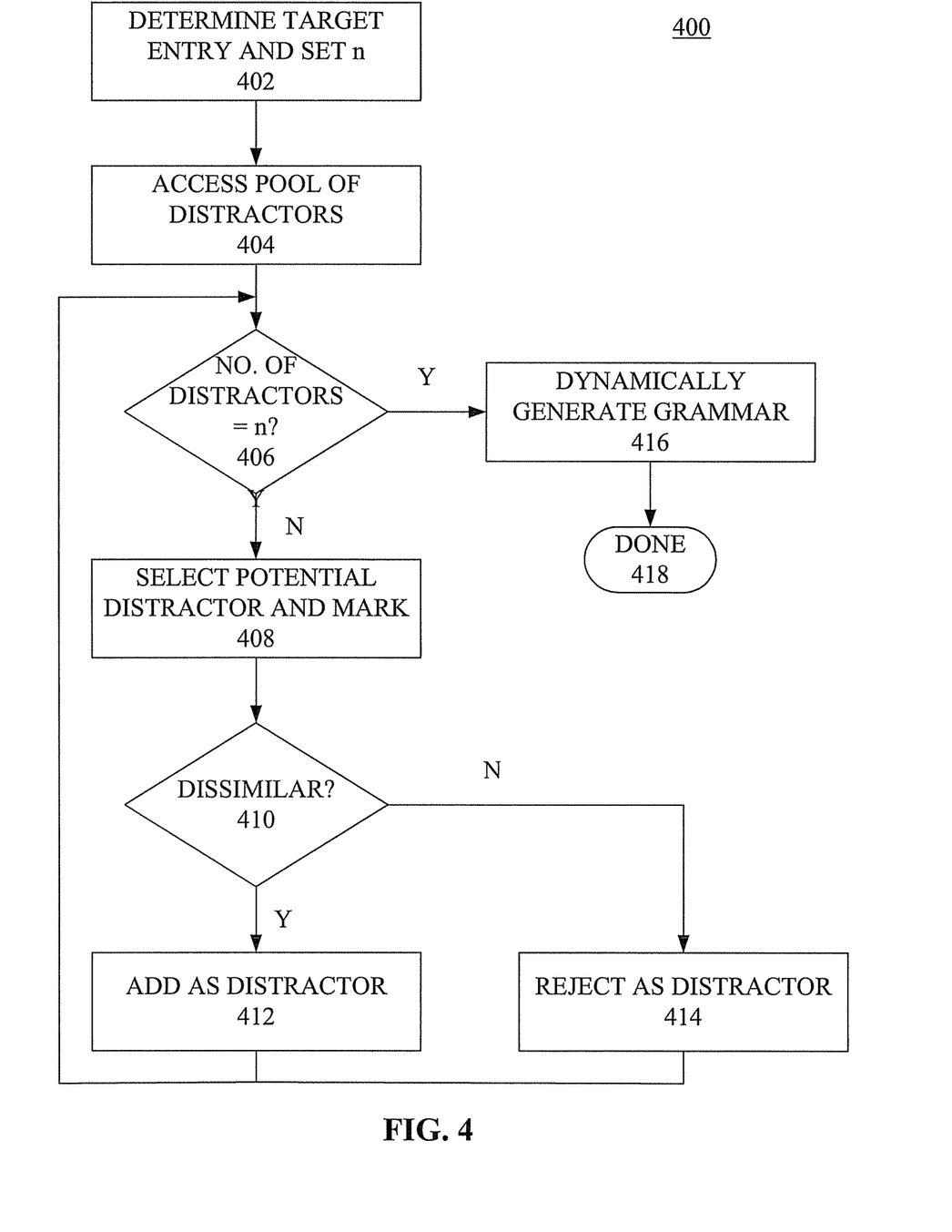
FIG. 4 is a flowchart of exemplary steps in a method for dynamically generating a grammar, according yet another embodiment of the invention.

FIG. 4 is a flowchart illustrating another method aspect of the invention. The flowchart illustrates exemplary steps of a method 400 for dynamically generating a grammar in which the number of distractors selected is a programmable variable, according to yet another embodiment of the invention. In particular instances, especially when using a large pool of potential distractors, it can be advantageous to limit the number of distractors that are to be selected from the pool. The method 400, according to this particular embodiment, provides the needed feature.

The method 400 proceeds again by determining a target entry, but further includes at step 402 setting a number, n, which specifies the number of distrators that are to be selected. The particular number, n, can optionally be a function of the particular target entry. After the number, n, is set, the pool of potential distractors is accessed at step 404. A determination is made at step 406 as to whether or not n distractors have already been selected. If not, a particular one of the potential distractors is selected and is temporarily marked at step 408. The marking is optionally performed so as to avoid later selecting the same potential distractor as the procedure continues to completion. At step 410, a determination is made as to whether or not the potential distractor is exhibits sufficient acoustic dissimilarity to the target entry. If so, the potential distractor is selected as a distractor at step 412. Otherwise, at step 414, the potential distractor is rejected. As illustrated, the method 400 continues iteratively repeating step 406 and following until n distractors have been selected. At that point, the dynamic grammar is generated at step 416. The method 400 illustratively concludes at step 418.

According to yet another embodiment, the selection of a potential distractor at step 408 can be made randomly. In an alternative embodiment, however, the selection at step 408 can be made according to a prioritization scheme, as already described.

Figure 5:
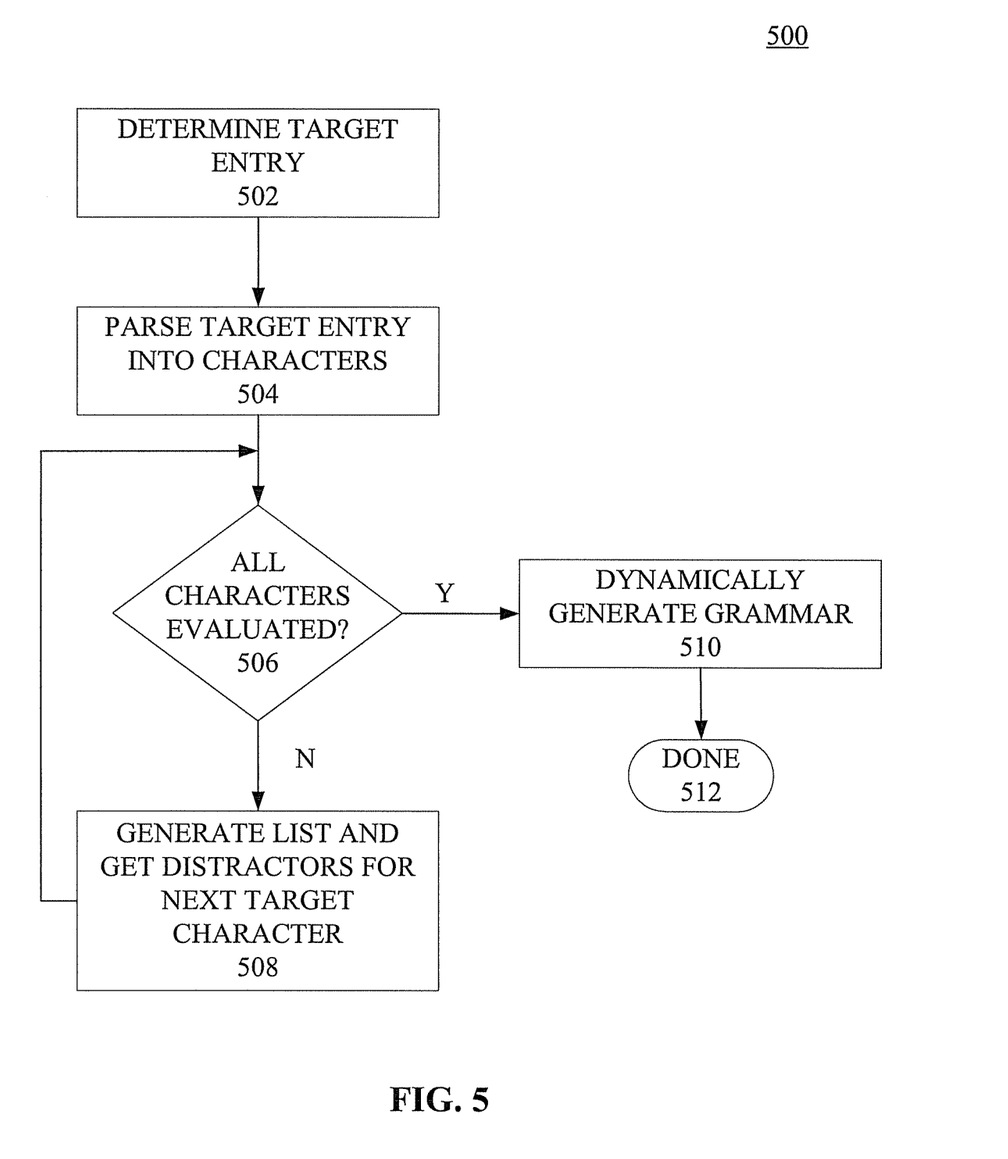
FIG. 5 is a flowchart of exemplary steps in a method for dynamically generating a grammar, according still another embodiment of the invention.

FIG. 5 is a flowchart illustrating still another method aspect of the invention. The flowchart illustrates exemplary steps of a method 500 for generating a dynamic grammar for a target entry that is parsed into individual characters. The characters can comprise a sequence of alphabetic characters corresponding to the letters of an alphabet. The method 500 illustratively includes determining a target entry at step 502. At step 504, the target entry is parsed into individual letters. A determination is made whether at step 506 as to whether or not each of the characters has been analyzed in terms of acoustic dissimilarity to a character parsed from the target entry. The method 500 continues until each of the characters has been thus analyzed and at least one corresponding distractor selected at step 508 based upon acoustic dissimilarity to a character. A grammar including at least one distractor for each character is generated at step 510, and the method illustratively concludes at step 512.

The invention, as already noted, can be realized in hardware, software, or a combination of hardware and software. The invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The invention, as also already noted, can be embedded in a computer program product. The computer program product can comprise a computer-readable storage medium in which is embedded a computer program comprising computer-executable code for directing a computing device or computer-based system to perform the various procedures, processes and methods described herein. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

The foregoing description of preferred embodiments of the invention have been presented for the purposes of illustration. The description is not intended to limit the invention to the precise forms disclosed. Indeed, modifications and variations will be readily apparent from the foregoing description. Accordingly, it is intended that the scope of the invention not be limited by the detailed description provided herein.

We claim:

1. A computer-implemented method for dynamically generating a speech recognition grammar, the method comprising:
   determining a target entry;
   accessing a plurality of potential distractors;
   selecting at least one distractor from the plurality of potential distractors, wherein the selected at least one distractor is selected based upon an acoustic dissimilarity between the distractor and the target entry; and
   generating, by at least one processor, a speech recognition grammar that includes the target entry and the at least one distractor.

2. The method of claim 1, further comprising prioritizing the potential distractors by assigning a rank to each of the potential distractors.

3. The method of claim 2, wherein the step of selecting at least one distractor comprises selecting as a distractor each potential distractor having an assigned rank that exceeds a minimum threshold.

4. The method of claim 1, wherein the step of selecting at least one distractor comprises selecting a predetermined number of distractors from the plurality of potential distractors, the predetermined number being set by a user.

5. The method of claim 1, further comprising receiving a speech utterance and determining the target entry based upon the received speech utterance.

6. The method of claim 1, wherein the target entry is a character string comprising letters of a pre-selected alphabet, wherein the plurality of potential distractors comprises the pre-selected alphabet, and wherein the step of selecting at least one distractor comprises iteratively selecting for each character of the character string every letter of the pre-selected alphabet that is acoustically dissimilar to a particular character of the character string.

7. The method of claim 6, wherein the step of generating a speech recognition grammar comprises generating for each character of the character string a corresponding pool of distractors that comprises each letter of the pre-selected alphabet that is acoustically dissimilar to the corresponding character.

8. The method of claim 7, further comprising receiving a speech utterance, wherein the speech utterance comprises a sequential enunciation of letters of the pre-selected alphabet interspersed with pauses between each pair of enunciations, and wherein the target entry is determined based upon the received speech utterance.

9. A system for dynamically generating a speech recognition grammar, the system comprising:
   at least one processor;
   an electronic storage for storing a plurality of potential distractors;
   an analyzing module, executable by the at least one processor, for analyzing acoustic dissimilarities between each of the potential distractors and a user-supplied target entry; and
   a grammar-generating module, executable by the at least one processor, for selecting at least one distractor from among the potential distractors, the at least one selected distractor having a predetermined level of acoustic dissimilarity to the target entry, and generating a grammar that includes the target entry and the at least one selected distractor.

10. The system of claim 9, further comprising a prioritizing module for prioritizing each of the potential distractors by assigning to each potential distractor a rank based upon a computed degree of dissimilarity between each potential distractor and the target entry.

11. The system of claim 10, wherein the grammar-generating module is configured to select as a distractor each potential distractor assigned a rank that is greater than a predetermined minimum rank.

12. The system of claim 9, wherein the system is integrated with a speech recognition system.

13. A non-transitory computer-readable storage device in which computer-executable code is stored, the computer-executable code configured to cause a computing device to execute the steps of:
   for dynamically generating a speech recognition grammar, the method comprising:
   determining a target entry;
   accessing a plurality of potential distractors;
   selecting at least one distractor from the plurality of potential distractors, wherein the selected at least one distractor is selected based upon an acoustic dissimilarity between the distractor and the target entry; and
   generating a speech recognition grammar that includes the target entry and the at least one distractor.

14. The non-transitory computer-readable storage device of claim 13, further comprising computer-executable code for causing the computing device to execute the step of prioritizing the potential distractors by assigning a rank to each of the potential distractors.

15. The non-transitory computer-readable storage device of claim 14, wherein the step of selecting at least one distractor comprises selecting as a distractor each potential distractor having an assigned rank that exceeds a minimum threshold.

16. The non-transitory computer-readable storage device of claim 13, wherein the step of selecting at least one distractor comprises selecting a predetermined number of distractors from the plurality of potential distractors, the predetermined number being set by a user.

17. The non-transitory computer-readable storage device of claim 13, further comprising computer-executable code for causing the computing device to execute the step of receiving a speech utterance and determining the target entry based upon the received speech utterance.

18. The non-transitory computer-readable storage device of claim 13, wherein the target entry is a character string comprising letters of a pre-selected alphabet, wherein the plurality of potential distractors comprises the pre-selected alphabet, and wherein the step of selecting at least one distractor comprises iteratively selecting for each character of the character string every letter of the pre-selected alphabet that is acoustically dissimilar to a particular character of the character string.

19. The non-transitory computer-readable storage device of claim 18, wherein the step of generating a speech recognition grammar comprises generating for each character of the character string a corresponding pool of distractors that comprises each letter of the pre-selected alphabet that is acoustically dissimilar to the corresponding character.

20. The non-transitory computer-readable storage device of claim 19, further comprising computer-executable code for causing the computing device to execute the step of receiving a speech utterance, wherein the speech utterance comprises a sequential enunciation of letters of the preselected alphabet interspersed with pauses between each pair of enunciations, and wherein the target entry is determined based upon the received speech utterance.

* * * * *